(12) United States Patent
Tanaka

(10) Patent No.: US 7,116,520 B2
(45) Date of Patent: Oct. 3, 2006

(54) GUIDE ROLLER AND MAGNETIC TAPE DRIVE

(75) Inventor: Atsushi Tanaka, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/235,578

(22) Filed: Sep. 6, 2002

(65) Prior Publication Data

US 2003/0048583 A1  Mar. 13, 2003

(30) Foreign Application Priority Data

Sep. 10, 2001  (JP) ............... 2001-273039

(51) Int. Cl.
*G11B 15/60* (2006.01)

(52) U.S. Cl. .............. 360/130.21; 360/130.31

(58) Field of Classification Search ............ 360/130.21
See application file for complete search history.

(56) References Cited

U.S. PATENT DOCUMENTS

| | | | | |
|---|---|---|---|---|
| 3,405,855 A | * | 10/1968 | Daly et al. ............... | 242/615.4 |
| 3,893,181 A | * | 7/1975 | Desourdis .............. | 360/130.23 |
| 4,427,166 A | * | 1/1984 | Oishi et al. .................. | 360/132 |
| 5,173,828 A | * | 12/1992 | Tanzer et al. .......... | 360/130.21 |
| 6,744,593 B1 | * | 6/2004 | Nayak et al. .......... | 360/130.21 |

FOREIGN PATENT DOCUMENTS

| | | |
|---|---|---|
| JP | 58-26786 | 8/1956 |
| JP | 60-111584 | 7/1985 |
| JP | 62-164634 | 10/1987 |
| JP | 1-174735 | 12/1989 |
| JP | 03104050 A * | 5/1991 |
| JP | 03230359 A * | 10/1991 |
| JP | 5-135444 | 6/1993 |
| JP | 06195823 A * | 7/1994 |
| JP | 8-329564 | 12/1996 |
| JP | 56-115788 | 2/2000 |

OTHER PUBLICATIONS

Japanese Office Action dated Oct. 14, 2003 with Partial English Translation.

* cited by examiner

*Primary Examiner*—William Korzuch
*Assistant Examiner*—Christopher R. Magee
(74) *Attorney, Agent, or Firm*—McGinn IP Law Group, PLLC

(57) ABSTRACT

A clockwise helical groove is formed on the outer periphery surface of a rigid roller toward one end from the center position in the axial direction. A counter-clockwise helical groove is formed on the outer periphery surface of the roller toward the other end from the center position in the axial direction. The roller rotates, accompanied by a magnetic tape. The clockwise groove of the roller gives a regulating force, which points toward the center position, to the magnetic tape. The counter-clockwise groove of the roller gives a second regulating force, which points toward the center position, to the magnetic tape. The magnetic tape is given the regulating forces simultaneously that point toward the center position in the axial direction of the roller. The magnetic tape is restrained from swinging to one end or the other end in the axial direction of the roller, and the tape traveling becomes stable.

20 Claims, 3 Drawing Sheets

GUIDE ROLLER AND MAGNETIC TAPE DRIVE

BACKGROUND OF THE INVENTION

The present invention relates to a guide roller of a magnetic tape drive, and more particular to a technique of a guide roller for guiding a magnetic tape for use in a half-inch cartridge magnetic tape drive.

Conventionally, the guide roller has been used for the purpose of carrying the magnetic tape into a precise position in the magnetic tape drive (JP-U1989-174735A, JPP1993-135444A, and JP-P1996-329564A).

The guide roller was described in JP-U1989-174735A that was composed of a roller rotatably supported by a supporting shaft, and flanges mounted on said supporting shaft so as to be positioned in both of the upper and lower ends of this roller. And, a spiral-shaped groove section was formed on the outer periphery surface of the roller.

Also, there is the description with regard to the guide roller in JP-P1993-135444A as well. This guide roller is composed of a fixed section, which does not rotate against a rotating center shaft, and two rotating rollers that are rotatable. The fixed section is arranged in the center in the tape-width direction. The rotating rollers are arranged in both ends of the fixed section in the tape-width direction. Thereby, a force, which causes the tape to approach toward the fixed section arranged in the center that does not rotate, always occurs. For this reason, a regulating force from the flanges that exist in both ends is alleviated. A result is that stable tape traveling, which causes less damage to the tape, materializes.

Furthermore, there is the description with regard to the guide roller in JP-P1996-329564A as well. A number of grooves for delivering the magnetic tape, which are spaced circumferentially, and extend in parallel to each other, are formed on the outer periphery of a feed roller. These grooves for delivering the magnetic tape are configured so that the directions of forces for delivering the magnetic tape point toward the center from both ends in the axial direction of the feed roller, and yet ahead in the rotating direction. This is a configuration for maintaining the status that the magnetic tape is arranged in the center in the axial direction of the feed roller.

However, the guide roller described in JP-U1989-174735A had the problem that the traveling direction of the tape did not stabilized in the event that the tape traveling changed drastically. This is because the tape has direction dependency of moving to one end or the other end depending upon the direction of the tape traveling, due to the spiral-shaped groove formed on the outer periphery surface of the roller only in the one-way direction.

Also, the guide roller described in JP-P1993-135444A had the problem that working efficiency in processing the guide roller dropped. This is because the parts item became numerous, and the manufacturing step and the assembling man-hour became numerous, due to the rotating rollers provided in the both ends with the fixed section interposed.

The guide roller described in JP-P1996-329564A has the roller of which at least the outer periphery surface was configured of an elastic member. And, for the purpose of realizing the stability of the tape traveling, the linearly symmetric groove is formed on the outer periphery surface of the roller in double-end direction.

However, in the event that the roller was configured of a rigid member, when forming the groove having the identical shape to that of the foregoing on the roller is intended, a special tool is required in some cases, and the problem existed that the working efficiency in processing the roller dropped.

SUMMARY OF THE INVENTION

The present invention lies in settling the above-mentioned problems.

An objective of the present invention is to provide the guide roller capable of stabilizing the tape traveling without having the direction dependency.

Also, another objective of the present invention is to provide the guide roller, wherein the groove to be formed on the outer periphery surface of the roller can be efficiently manufactured without requiring a special tool.

In the present invention, a first invention for settling the above-mention tasks comprises:

bearings fixed to a shaft;

a roller that is rotatably supported by the bearings, guides the magnetic tape that travels, and rotates, being accompanied by the traveling of the magnetic tape;

a first helical groove having a predetermined turning direction, being formed on the outer periphery surface of said roller; and a second helical groove having the opposite turning direction to the helical direction of the first helical groove, being formed on the outer periphery surface of said roller.

In this invention, the first helical groove and the second helical groove formed on the outer periphery surface of the roller can give the regulating forces in the axial direction of the roller that corresponded to the turning directions of the helical grooves to the magnetic tape.

Also, a second invention for settling the above-mentioned tasks is characterized in that, in the first invention, a forming area of the first helical groove is an area ranging from a center position in an axial direction of said roller to one end, and a forming area of second helical groove is an area ranging from the center position to the other end.

In this invention, a first regulating force in the axial direction of the roller that corresponded to the turning direction of the first helical groove, and a second regulating force in the axial direction of the roller that corresponded to the turning direction of the second helical groove are given to the magnetic tape. That is, the turning direction of the first helical groove and the turning direction of the second helical groove are opposite to each other, whereby, the first regulating force and the second regulating force, each of which has the opposite direction to the other with the center position in the axial direction of the roller taken as a boundary, are given.

A third invention for settling the above-mentioned tasks is characterized in that, in the above-mentioned first invention, the roller is configured of a rigid member.

A fourth invention for settling the above-mentioned tasks is characterized in that, in the above-mentioned first invention, the first helical groove and the second helical groove are doubly formed across the entire round of the outer periphery surface of said roller.

In this invention, the magnetic tape is simultaneously given the regulating forces in the axial direction of the roller that corresponded to the turning directions of the helical grooves.

A fifth invention for settling the above-mentioned tasks comprises:

bearings fixed to a shaft;

a roller that is rotatably supported by said bearings, guides the magnetic tape that travels, and rotates, being accompanied by the traveling of the magnetic tape;

a first helical groove having a predetermined turning direction, being formed on the outer periphery surface of an area ranging from the center position in the axial direction of the roller to one end; and a second helical groove having the opposite turning direction to the helical direction of the first helical groove, being formed on the outer periphery surface of an area ranging from the center position to the other end.

A sixth invention for settling the above-mentioned tasks is characterized in that a magnetic drive comprising:

a guide roller having;

bearings fixed to a shaft, a roller that is rotatably supported by said bearings, guides the magnetic tape that travels, and rotates, being accompanied by the traveling of the magnetic tape, a first helical groove having a predetermined turning direction, being formed on the outer periphery surface of said roller, and a second helical groove having the opposite turning direction to the helical direction of said first helical groove, being formed on the outer periphery surface of said roller, and flanges mounted on one end and the other end in the axial direction of said guide roller.

In this invention, the magnetic tape can be prevented from coming off the guide roller.

A seventh invention for settling the above-mention tasks comprises:

a magnetic head and a guide roller having;

bearings fixed to a shaft, a roller that is rotatably supported by said bearings, guides the magnetic tape that travels, and rotates, being accompanied by the traveling of the magnetic tape, a first helical groove having a predetermined turning direction, being formed on the outer periphery surface of said roller, and a second helical groove having the opposite turning direction to the helical direction of said first helical groove, being formed on the outer periphery surface of said roller, is characterized in that said guide rollers, which are arranged so as to cause the bearing of said roller to cross the traveling direction of the magnetic tape at right angles, are provided on both sides with a magnetic head interposed in a predetermined distance from said magnetic head.

In this invention, due to the guide rollers provided in both ends of the magnetic head, the tape can travel stably in either tape traveling direction.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Next, an embodiment of the present invention will be explained in conjunction with the accompanied drawings.

Figure 1:
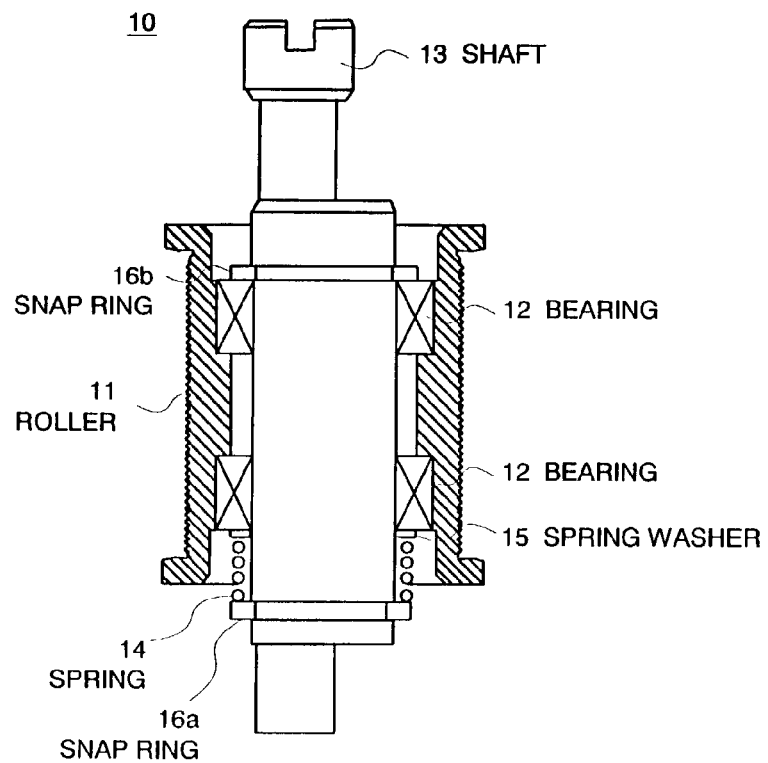
FIG. 1 is a sectional view of one embodiment of the present invention.
Figure 2:
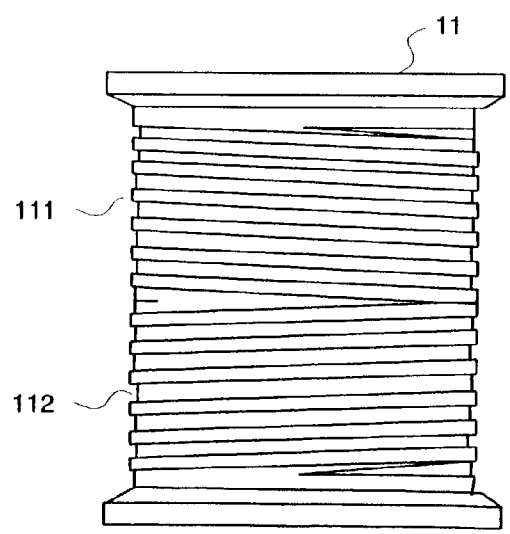
FIG. 2 is a front view of the main portion of one embodiment of the present invention.

FIG. 1 is a sectional view of one embodiment of the guide roller. FIG. 2 is a front view of one embodiment of the main portion of the guide roller.

In FIG. 1, a guide roller 10 has bearings 12 press-fit into the hollow inside of a hollow circular cylinder-shaped roller 11 for carrying the magnetic tape. These bearings 12 allow an approximately circular cylinder-shaped shaft 13 to penetrate the hollow inside of the roller 11. Additionally, flanges having a larger diameter as compared with the diameter of the roller 11 are formed in one end (lower end) and the other end (upper end) of the roller 11. By forming these flanges, the magnetic tape can travel stably between the flanges formed in the both ends of the roller 11.

Also, as shown in FIG. 1, a force is applied to the lower end of the bearing 12 by a spring 14 via a spring washer 15 from the lower-end to the upper-end directions, thus allowing the bearing 12 to be pressed against the roller 11. Also, the opposite end to the spring washer 15 with the spring 14 interposed is fixed by a snap ring 16$a$. Further, the upper end of the bearing 12 is fixed by a snap ring 16$b$. Thereby, the roller 11 is rotatably supported by the bearings 12 fixed to a shaft 13.

Furthermore, the roller 11 is configured of a rigid member. For example, the rigid member is stainless or other metal. As shown in FIG. 2, on the outer periphery surface of the roller 11, a counter-clockwise helical groove 111 is formed in the upper side of the center position in the axial direction. Further, on the outer periphery surface of the roller 11, a clockwise helical groove 112 is formed in the lower side of the center position in the axial direction. Herein, the helical groove 111 and the helical groove 112 should be formed in the rigid member in a constant direction. For this reason, no special tool is required, and they can be easily formed by means of a general-purpose lathe.

Next, the magnetic tape drive in which the guide roller 10 is employed will be explained.

Figure 3:
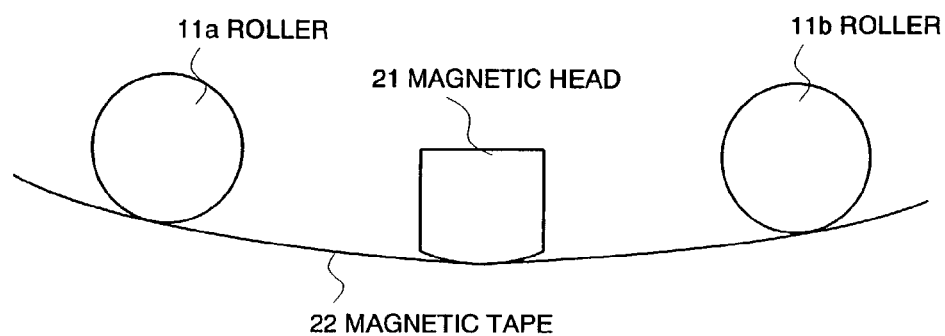
FIG. 3 is a top view of one example of use examples of the present invention.
Figure 4:
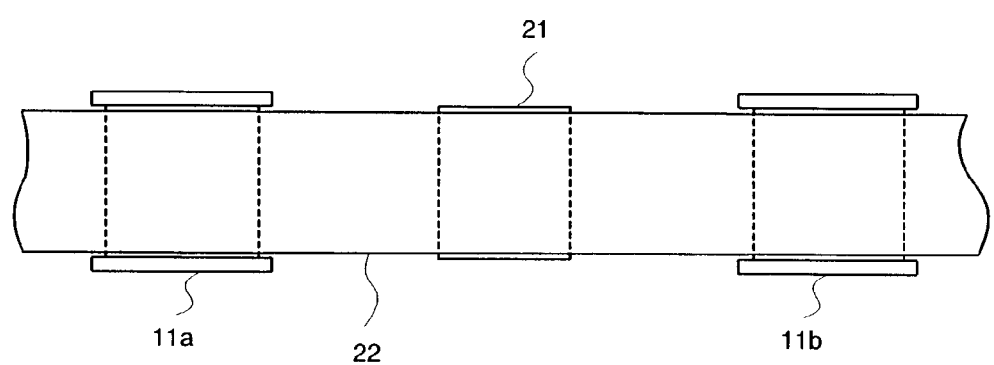
FIG. 4 is a side view of one example of use examples of the present invention.

For example, as shown in the top view of FIG. 3 and the side view of FIG. 4, the rollers 11$a$ and 11$b$ are arranged in the both ends with a magnetic head 21 interposed in a predetermined distance from the magnetic head 21 respectively (the upstream position and the downstream position of the tape traveling). Additionally, illustration of a shaft 13 was omitted in FIG. 3 and FIG. 4.

As shown in FIG. 3 and FIG. 4, a magnetic tape 22 is guided to the outer periphery surface of the roller 11$a$, and reaches the front of the magnetic head 21. Thereafter, the magnetic tape 22 is guided to the outer periphery surface of the roller 11$b$, and reaches the outside. The magnetic tape 22 travels at a constant speed in such a status. The fixed magnetic head 21 reads out magnetic recording of information signals from the magnetic tape 22. These read-out information signals are regenerated by the magnetic tape drive.

Also, the traveling direction of the magnetic tape 22 may be opposite to the foregoing. In this case, the magnetic tape 22 is guided to the outer periphery surface of the roller 11$b$, and reaches the front of the magnetic head 21. Thereafter, the magnetic tape 22 is guided to the outer periphery surface of the roller 11a, and reaches the outside. Also in the event that the magnetic tape 22 travels at a constant speed in the opposite direction to the foregoing in such a manner, the fixed magnetic head 21 reads out the magnetic recording of the information signals from the magnetic tape. These read-out information signals are regenerated by the magnetic tape drive. However, a gap section of the magnetic head 21 is adapted to scan the different region responding to the traveling direction of the magnetic tape 22.

Next, an operation of this embodiment will be explained, referring to FIG. 5 and FIG. 6. Additionally, illustration of the shaft 13 was omitted in FIG. 5 and FIG. 6. Also, the shaft 13 is fixed to the area where the guide roller 10 is mounted. And the roller 11 is rotatably supported by the bearings in the area where the shaft 13 was mounted.

Figure 5:
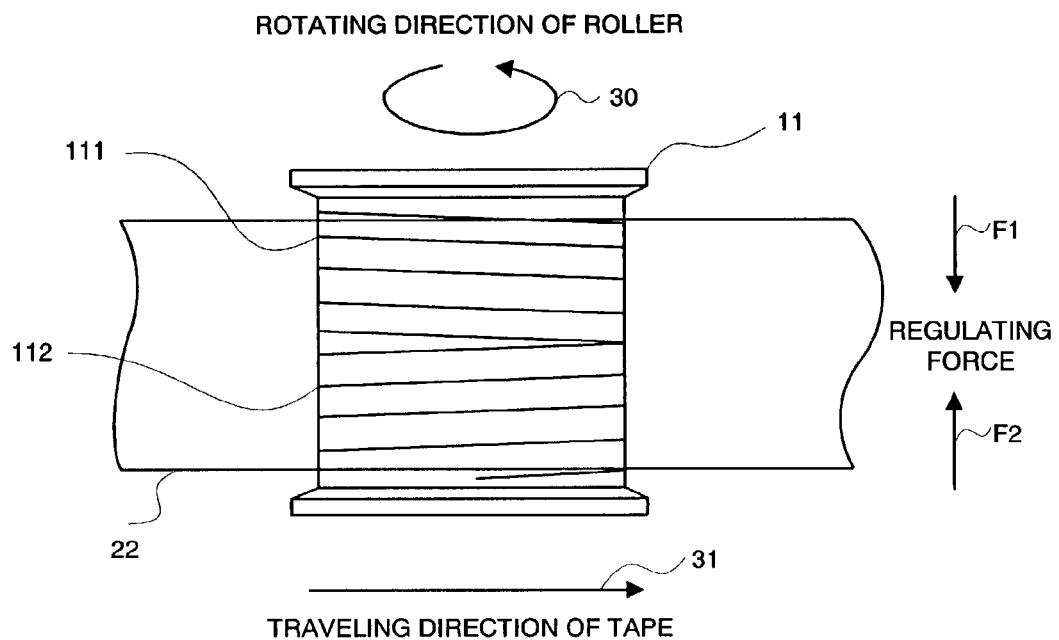
FIG. 5 is an explanation view of an operation of the present invention.

FIG. 5 illustrates the operation of the roller 11 at the event that the magnetic tape 22 travels from the left to the right directions in the same figure.

The roller 11 rotates, being accompanied by the traveling of the magnetic tape 22. The rotating direction of the roller 11 is a counter-clockwise direction 30 as against a tape traveling direction 31 of the magnetic tape.

In such a manner, the helical groove 111 gives a downward regulating force F1 to the magnetic tape 22 that travels in the tape traveling direction 31. Also, the helical groove 112 gives an upward regulating force F2 to the magnetic tape 22 that travels in the tape traveling direction 31. A result is that the magnetic tape 22 is given the regulating forces F1 and F2 simultaneously that point toward the center position in the axial direction of the roller 11. For this reason, the magnetic tape 22 is restrained from moving vertically, and the traveling becomes stable.

Figure 6:
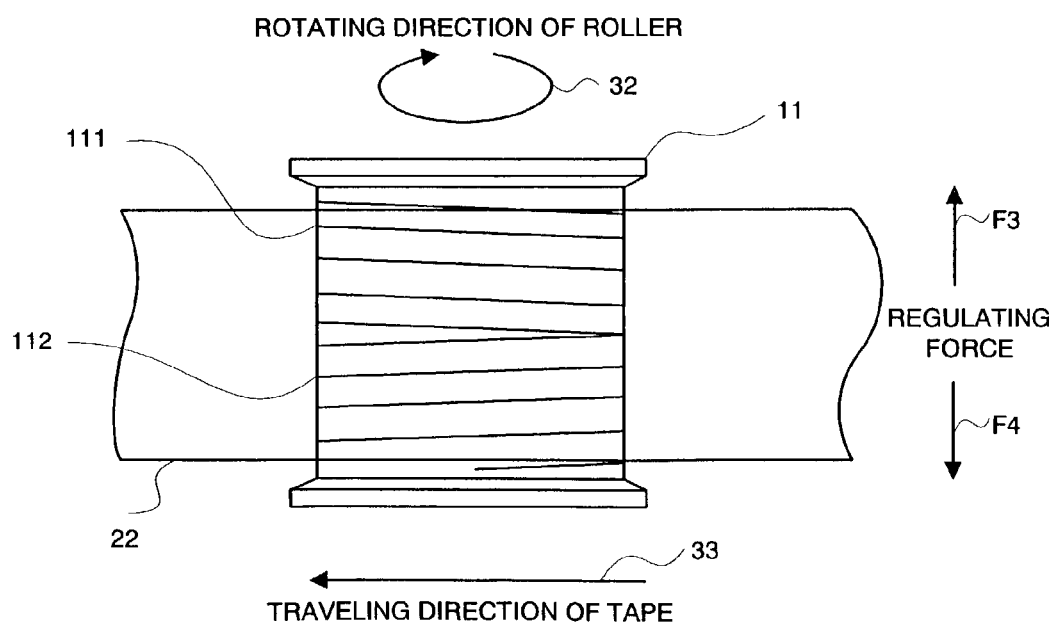
FIG. 6 is an explanation view of an operation of the present invention.

FIG. 6 illustrates the operation of the roller 11 in the event that the magnetic tape 22 travels from the right to the left directions in the same figure.

The roller 11 rotates, being accompanied by the traveling of the magnetic tape 22. The rotating direction of the roller 11 is a clockwise direction 32 as against a tape traveling direction 33 of the magnetic tape.

In such a manner, the helical groove 111 gives an upward regulating force F3 to the magnetic tape 22 that travels in the tape traveling direction 33. Also, the helical groove 112 gives a downward regulating force F4 to the magnetic tape 22 that travels in the tape traveling direction 33. A result is that the magnetic tape 22 is given the regulating forces F3 and F4 simultaneously that depart from the center position in the axial direction of the roller 11. For this reason, the magnetic tape 22 is restrained from moving vertically, and the traveling becomes stable.

Additionally, the present invention is not limited to the above-mentioned embodiments. For example, the clockwise helical groove to be formed on the outer periphery surface of the roller may be formed in the upper side from the center position in the axial direction of the roller. Further, the counter-clockwise helical groove to be formed on the outer periphery surface of the roller may be formed in the lower side from the center position in the axial direction of the roller.

Also, in this embodiment, the helical grooves, each of which has the opposite turning direction to the other with the center in the axial direction of the roller taken as a boundary, were formed on the outer periphery surface of the roller. However, both of the clockwise helical groove and the counter-clockwise helical groove may be formed across the entire round ranging from the lower end of the outer periphery surface of the roller to the upper end. Even though such helical grooves are formed, the similar effect to that of the above-mentioned embodiment can be obtained. A forming method of the helical groove is, at first, to form one helical groove across the entire round of the outer periphery surface of the roller. Next, the other helical groove is formed across the entire round of the outer periphery surface of the roller. In this forming method, the working step slightly increases as compared with the foregoing embodiment. But, the working man-hour can be reduced as compared with the conventional working man-hour.

In accordance with the present invention, the helical groove formed on the outer periphery surface of the roller, which rotates together with the magnetic tape that travels, allows the regulating force in the axial direction of the roller, which responded to the turning direction of the helical groove, to be given to the magnetic tape. A result is that the vertical movement of the magnetic tape can be restrained without depending upon the traveling direction of the magnetic tape.

Also, in accordance with the present invention, the roller is the rigid member, whereby the helical groove can be formed on the outer periphery surface of the roller by employing the general-purpose lathe. A result is that working efficiency for processing the roller improves, and the roller can be manufactured simply.

The entire disclosure of Japanese Patent Application No. 2001-273039 filed on Sep. 10, 2001 including specification, claims, drawings and summary are incorporated herein by reference in its entirely.

What is claimed is:

1. A guide roller for being mounted on a magnetic tape apparatus, said guide roller comprising:
    bearings fixed to a shaft;
    a roller that is rotatably supported by said bearings, said roller guiding a magnetic tape that travels, and rotates, being accompanied by traveling of the magnetic tape, said roller being mounted on the magnetic tape apparatus on a side of the magnetic tape that a magnetic tape head is mounted on;
    a first helical groove comprising a predetermined turning direction, being formed on an outer periphery surface of said roller; and
    a second helical groove comprising an opposite turning direction to the turning direction of said first helical groove, being formed on an outer periphery surface of said roller,
    wherein said first helical groove and said second helical groove are doubly formed over one another across a circumference of the outer periphery surface of said roller.

2. The guide roller according to claim 1, wherein a forming area of said first helical groove comprises an area ranging from a center position in an axial direction of said roller to a first end, and
    wherein a forming area of said second helical groove comprises an area ranging from said center position to an end opposite said first end.

3. The guide roller according to claim 1, wherein said roller comprises a rigid member.

4. A guide roller for being mounted on a magnetic tape apparatus, said guide roller comprising:
    bearings fixed to a shaft;
    a roller that is rotatably supported by said bearings, said roller guiding a magnetic tape that travels, and rotates, being accompanied by traveling of the magnetic tape, said roller being mounted on the magnetic tape apparatus on a side of the magnetic tape that a magnetic tape head is mounted on;

a first helical groove comprising a predetermined turning direction, being formed on an outer periphery surface of an area ranging from a center position in an axial direction of said roller to a first end; and a second helical groove comprising an opposite turning direction to the turning direction of said first helical groove, being formed on an outer periphery surface of an area ranging from said center position to an end opposite said first end, wherein said first helical groove and said second helical groove are doubly formed over one another across a circumference of the outer periphery surface of said roller.

5. A magnetic tape drive comprising:

a guide roller mounted on the magnetic tape drive comprising:

bearings fixed to a shaft;

a roller that is ratatably supported by said bearings, said roller guiding a magnetic tape that travels, and rotates, being accompanied by traveling of the magnetic tape;

a first helical groove comprising a predetermined turning direction, being formed on an outer periphery surface of said roller;

a second helical groove comprising an opposite turning direction to the turning direction of said first helical groove, being formed on an outer periphery surface of said roller; and flanges mounted on one end and the other end in an axial direction of said guide roller;

wherein said guide roller is mounted on said magnetic tape drive on a side of the magnetic tape that a magnetic tape head is mounted on, and wherein said first helical groove and said second helical groove are doubly formed over one another across a circumference of the outer periphery surface of said roller.

6. A magnetic tape drive comprising:

a magnetic head; and a plurality of guide rollers mounted on the magnetic tape drive, each guide roller comprising:

bearings fixed to a shaft;

a roller that is rotatably supported by said bearings, said roller guiding a magnetic tape that travels, and rotates, being accompanied by traveling of the magnetic tape;

a first helical groove comprising a predetermined turning direction, being formed on an outer periphery surface of said roller;

a second helical groove comprising an opposite turning direction to the turning direction of said first helical groove, being formed on an outer periphery surface of said roller, wherein said guide rollers, which are arranged so as to cause said bearing of said roller to cross a traveling direction of said magnetic tape at right angles, are provided on both ends with a magnetic head interposed in a predetermined distance from said magnetic head, and wherein said guide rollers are mounted on said magnetic tape drive on a side of the magnetic tape that said magnetic head is mounted on, and wherein said first helical groove and said second helical groove are doubly formed over one another across a circumference of the outer periphery surface of said roller.

7. The guide roller according to claim 3, wherein said rigid member comprises stainless metal.

8. The magnetic tape drive according to claim 6, wherein said plurality of guide rollers comprises a first guide roller positioned on a first side of said magnetic head and a second guide roller positioned on a side opposite the side of said first guide roller of said magnetic head.

9. The guide roller according to claim 1, further comprising:

a spring comprising a first end positioned against each of said bearings to apply a force against a first end of said each bearing to press said each bearing against said roller.

10. The guide roller according to claim 9, further comprising:

a retaining ring positioned around the shaft against a second end of said spring to fix said spring against said each bearing.

11. The guide roller according to claim 1, wherein the predetermined turning direction of said first helical groove comprises a counter clockwise helical groove.

12. The guide roller according to claim 1, wherein the predetermined turning direction of said first helical groove comprises a clockwise helical groove.

13. The guide roller according to claim 1, wherein said first helical groove and said second helical groove are formed on said outer periphery surface of said roller in a constant direction.

14. The guide roller according to claim 4, further comprising:

a spring comprising a first end positioned against each of said bearings to apply a force against a first end of said each bearing to press said each bearing against said roller.

15. The guide roller according to claim 14, further comprising:

a retaining ring positioned around the shaft against a second end of said spring to fix said spring against said each bearing.

16. The magnetic tape drive according to claim 5, wherein said guide roller further comprises:

a spring comprising a first end positioned against each of said bearings to apply a force against a first end of said each bearing to press said each bearing against said roller.

17. The magnetic tape drive according to claim 16, wherein said guide roller further comprises:

a retaining ring positioned around the shaft against a second end of said spring to fix said spring against said each bearing.

18. The magnetic tape drive according to claim 6, wherein said guide roller further comprises:

a spring comprising a first end positioned against each of said bearings to apply a force against a first end of said each bearing to press said each bearing against said roller.

19. The magnetic tape drive according to claim 18, wherein said guide roller further comprises:

a retaining ring positioned around the shaft against a second end of said spring to fix said spring against said each bearing.

20. The guide roller according to claim 1, wherein the magnetic tape apparatus comprises a half-inch cartridge magnetic tape drive.

* * * * *